United States Patent
Chandramouli et al.

(10) Patent No.: US 9,876,851 B2
(45) Date of Patent: Jan. 23, 2018

(54) CLOUD-EDGE TOPOLOGIES

(71) Applicant: Microsoft Technology Licensing, LLC, Redmond, WA (US)

(72) Inventors: Badrish Chandramouli, Redmond, WA (US); Suman K. Nath, Redmond, WA (US); Wenchao Zhou, Philadelphia, PA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

(21) Appl. No.: 14/750,031

(22) Filed: Jun. 25, 2015

(65) Prior Publication Data

US 2015/0296000 A1 Oct. 15, 2015

Related U.S. Application Data

(63) Continuation of application No. 13/337,291, filed on Dec. 27, 2011, now Pat. No. 9,098,344.

(51) Int. Cl.
*G06F 15/16* (2006.01)
*H04L 29/08* (2006.01)
*G06F 9/50* (2006.01)
*G06F 17/30* (2006.01)
*H04L 12/26* (2006.01)
(Continued)

(52) U.S. Cl.
CPC .............. *H04L 67/10* (2013.01); *G06F 9/505* (2013.01); *G06F 9/5072* (2013.01); *G06F 17/30516* (2013.01); *H04L 43/045* (2013.01); *H04L 43/065* (2013.01); *H04L 47/70* (2013.01); *H04L 67/24* (2013.01); *H04W 4/023* (2013.01)

(58) Field of Classification Search
CPC ....... H04L 67/10; H04L 67/24; H04L 43/045; H04W 4/023; G06F 17/30516
See application file for complete search history.

(56) References Cited

U.S. PATENT DOCUMENTS 6,332,163 B1 12/2001 Bowman-Amuah
6,578,054 B1 * 6/2003 Hopmann ......... G06F 17/30578
707/625
(Continued)

FOREIGN PATENT DOCUMENTS

CN 101977242 A 2/2011
JP 2009-093417 A 4/2009
(Continued)

OTHER PUBLICATIONS

"Office Action Issued in Russian Patent Application No. 2014126065", dated Dec. 26, 2016, 4 Pages. (W/o English Translation).
(Continued)

*Primary Examiner* — David Lazaro
(74) *Attorney, Agent, or Firm* — Rainier Patents, P.S.

(57) ABSTRACT

The description relates to cloud-edge topologies. Some aspects relate to cloud-edge applications and resource usage in various cloud-edge topologies. Another aspect of the present cloud-edge topologies can relate to the specification of cloud-edge applications using a temporal language. A further aspect can involve an architecture that runs data stream management systems (DSMSs) engines on the cloud and cloud-edge computers to run query parts.

20 Claims, 7 Drawing Sheets

(51) Int. Cl.
  *H04L 12/911* (2013.01)
  *H04W 4/02* (2009.01)

(56) References Cited

U.S. PATENT DOCUMENTS

| | | | |
|---|---|---|---|
| 6,671,276 B1 | 12/2003 | Bakre et al. | |
| 6,959,320 B2* | 10/2005 | Shah | G06F 8/65 |
| | | | 709/203 |
| 8,806,014 B2* | 8/2014 | Carter | G06F 9/5072 |
| | | | 705/400 |
| 9,098,344 B2* | 8/2015 | Chandramouli | G06F 9/505 |
| 2001/0052008 A1 | 12/2001 | Jacobus et al. | |
| 2008/0270526 A1* | 10/2008 | Barnett | H04L 67/10 |
| | | | 709/203 |
| 2009/0113437 A1 | 4/2009 | Sedukhin et al. | |
| 2009/0171890 A1* | 7/2009 | Johnson | G06F 17/30516 |
| 2009/0224941 A1 | 9/2009 | Kansal et al. | |
| 2009/0300615 A1 | 12/2009 | Andrade et al. | |
| 2010/0332818 A1 | 12/2010 | Prahlad et al. | |
| 2011/0041080 A1 | 2/2011 | Fleischman et al. | |
| 2011/0072489 A1 | 3/2011 | Parann-Nissany | |
| 2011/0126168 A1 | 5/2011 | Ilyayev | |
| 2011/0161973 A1* | 6/2011 | Klots | G06F 17/30566 |
| | | | 718/104 |
| 2011/0282975 A1 | 11/2011 | Carter | |
| 2013/0166712 A1* | 6/2013 | Chandramouli | G06F 9/505 |
| | | | 709/223 |
| 2015/0296000 A1* | 10/2015 | Chandramouli | G06F 9/505 |
| | | | 709/203 |

FOREIGN PATENT DOCUMENTS

| | | |
|---|---|---|
| RU | 2435236 C1 | 11/2011 |
| WO | 2009/146087 A1 | 12/2009 |

OTHER PUBLICATIONS

"Office Action Issued in Japanese Patent Application No. 2014-550337", dated Dec. 6, 2016, 6 Pages.
Ishii, et al., "Elastic Data Stream Processing with Cloud", In Proceedings of Symposium on Advanced Computing Systems and Infrastructures, May 26, 2011, 11 Pages.
Ohki, et al., "An Optimization Method for Distributed Stream Processing with Dynamic Selection of Target Information Sources", In IPSJ SIG Technical Report, vol. 2008, Issue 88, Sep. 23, 2008, 8 Pages.
"LINQPad", Published on: Dec. 2011, retrieved at <<http://web.archive.org/web/20111219013419/http://www.linqpad.net/>> on Mar. 6, 2015, 2 pages.
Ahmad et al., "Network-Aware Query Processing for Stream-based Applications", Proceedings of the 2004 VLDB Conference, Jan. 1, 2004, pp. 456-467 (12 pages).
Chandramouli et al., "Accurate Latency Estimation in a Distributed Event Processing System", Data Engineering (ICDE), 2011 IEEE 27th International Conference, Apr. 11, 2011, pp. 255-266 (12 pages).
Chandramouli et al., "Race: Real-time Applications over Cloud-Edge," SIGMOD '12, May 20-24, 2012, Scottsdale, AZ, USA, 4 pages.
Chandramouli et al., "Supporting Distributed Feed-Following Apps Over Edge Devices", Microsoft Research Technical Report No. MSR-TR-2012-73, Jul. 2012, published in Proceedings of the VLDB Endowment, vol. 6, No. 13, Aug. 2013, 12 pages.
Kalyvianaki et al., "SQPR: Stream Query Planning with Reuse," Proceedings of the 27th IEEE International Conference on Data Engineering, Apr. 11-16, 2011, pp. 840-851 (12 pages).
Kleminger, Wilhelm, "Stream Processing in the Cloud", retrieved at <<http://www.doc.ic.ac.uk/teaching/distinguished-projects/2010/w.kleminger.pdf>>, Jun. 2010, 91 pages.
Kossmann, D., "The State of the Art in Distributed Query Processing," ACM Computing Surveys, vol. 32, No. 4, Dec. 2000, pp. 422-469 (48 pages).
Li et al., "Minimizing Communication Cost in Distributed Multi-Query Processing," Proceedings of the 25th IEEE International Conference on Data Engineering, Mar. 29-Apr. 2, 2009, pp. 772-783 (12 pages).
Loo et al., "Declartive Networking: Language, Execution and Optimization", ACM SIGMOD International Conference on Management of Data, Jun. 27-29, 2006, 12 pages.
Microsoft Corporation, The LINQ Project, "LINQ (Language-Integrated Query), Visual Studio 2010", retrieved from <<https://msdn.microsoft.com/en-us/library/bb397926(d=printer,v=vs.100).aspx>>, 2010, 26 pages.
Quoc et al., "Optimization and Evaluation of a Multimedia Streaming Service on Hybrid Telco Cloud", International Journal on Cloud Computing: Services and Architecture (IJCCSA), vol. 1, No. 2, Aug. 2011, pp. 1-20 (20 pages).
Simmhan et al. "Adaptive Rate Stream Processing for Smart Grid Applications on Clouds", Proceedings of the 2nd International Workshop on ScienceCloud'11, Jun. 8, 2011, San Jose, California, 5 pages.
Zinn et al., "Towards Reliable, Performant Workflows for Streaming-Applications on Cloud Platforms", retrieved at <<http://ceng.usc.edu/~simmhan/pubs/zinn-ccgrid-2011-2011.pdf>>, Proceedings of the 11th IEEE/ACM International Symposium on Cluster, Cloud and Grid Computing, 2011, 10 pages.
Restriction Requirement dated Dec. 18, 2014 from U.S. Appl. No. 13/337,291, 6 pages.
Response filed Feb. 17, 2015 to Restriction Requirement dated Dec. 18, 2014 from U.S. Appl. No. 13/337,291, 9 pages.
Notice of Allowance dated Mar. 31, 2015 from U.S. Appl. No. 13/337,291, 10 pages.
Search Report dated Jan. 10, 2015 from China Patent Application No. 201210579767.5, 2 pages.
First Office Action dated Jan. 13, 2015 from China Patent Application No. 201210579767.5, 6 pages.
Response filed Mar. 6, 2015 to First Office Action dated Jan. 13, 2015 from China Patent Application No. 201210579767.5, 9 pages.
Second Office Action dated Jul. 8, 2015 from China Patent Application No. 201210579767.5, 7 pages.
International Search Report and Written Opinion dated May 1, 2013 from PCT Patent Application No. PCT/US2012/070427, 8 pages.
International Preliminary Report on Patentability dated Jul. 10, 2014 from PCT Application No. PCT/US2012/070427, 5 pages.
European Search Report dated Aug. 24, 2015 from European Patent Application No. 12861882.4, 27 pages.
Examination Report dated Sep. 3, 2015 from European Patent Application No. 12861882.4, 7 pages.
Intention to Grant dated May 6, 2016 from China Patent Application No. 201210579767.5, 3 pages.
Response filed Oct. 14, 2015 to the Examination Report dated Sep. 3, 2015 from European Patent Application No. 12861882.4, 5 pages.
Office Action dated Dec. 8, 2015 from China Patent Application No. 201210579767.5, 4 pages.
Decision on Grant dated Apr. 21, 2017 from Russian Patent Application No. 2014126065, 13 pages.
Examination Report dated Jun. 2, 2017 from Australian Patent Application No. 2012362829, 3 pages.
Decision to Grant dated May 30, 2017 from Japanese Patent Application No. 2014-550337, 5 pages.
Response filed Jul. 5, 2017 to the Examination Report dated Jun. 2, 2017 from Australian Patent Application No. 012362829, 19 pages.
Ohki et al., "Implementation and Evaluation of Stream Processing with Dynamic Selection of Target Information Sources", In Journal of Transactions of the Information Processing Society of Japan, vol. 2, Issue 3, Jan. 15, 2009, pp. 1-17, 17 pages.
Response filed Mar. 6, 2017 from Japanese Patent Application No. 2014-550337, 8 pages.
Response filed Feb. 27, 2017 from Russian Patent Application No. 2014126065, 7 pages.

* cited by examiner

CLOUD-EDGE TOPOLOGIES

CROSS-REFERENCE TO RELATED APPLICATIONS

This patent application is a continuation of, and claims priority to, U.S. patent application No. 13/337,291, filed on Dec. 27, 2011, which is incorporated herein by reference in its entirety.

BACKGROUND

The widespread adoption of 'smart' portable computing devices, such as smartphones, by consumers and availability of vast amounts of cloud-based computing resources have led to what is known as the "cloud-edge topology". These smart portable computing devices are termed 'smart' in that processor and memory advancements allow these devices to have substantial computing resources available to the user. Smart portable computing devices can generate real-time data such as GPS location, battery consumption, speed, etc. These smart portable computing devices can also be thought of as cloud-edge devices in that communication between an individual device and the cloud-based resources can be thought of as an edge.

Given the substantial computing resources available on the smart portable computing device, the user may select various applications to run on his/her device. Many of these applications can be termed as cloud-edge applications in that an application instance runs on the smart portable computing device and another application instance runs on the cloud-based computing resources. There exists a broad class of cloud-edge applications that correlate data across multiple smart portable computing devices and the cloud to achieve the application's functionality. An example is a friend-finder application that functions to notify a user if any friends are close by. This application functionality depends upon correlation of real-time locations and slow-changing data such as social networks. While great amounts of computing resources are available on the smart portable computing devices and the cloud-based resources, resource usage, such as communication resources, can be significant when large numbers of smart portable computing devices are running cloud-edge applications.

SUMMARY

The description relates to cloud-edge topologies. Some aspects relate to cloud-edge applications and resource usage in various cloud-edge topologies. One example can evaluate a real-time streaming query that utilizes data from multiple different edge computing devices. The multiple different edge computing devices can be configured to communicate with cloud-based resources but not to communicate directly with one another. Individual edge computing devices include an instantiation of an application conveyed in a declarative temporal language. This example can compare resource usage between first and second scenarios. The first scenario involves uploading query data from the multiple different edge computing devices to the cloud-based resources for processing. The second scenario involves uploading the query data from all but one node of the multiple different edge computing devices to the cloud-based resources and downloading the query data to the one node of the multiple different edge computing devices for processing.

Another aspect of the present cloud-edge topologies can relate to the specification of cloud-edge applications using a temporal language. A further aspect can involve an architecture that runs data stream management systems (DSMSs) engines on the cloud and cloud-edge computers to run query parts.

The above listed examples are intended to provide a quick reference to aid the reader and are not intended to define the scope of the concepts described herein.

BRIEF DESCRIPTION OF THE DRAWINGS

The accompanying drawings illustrate implementations of the concepts conveyed in the present application. Features of the illustrated implementations can be more readily understood by reference to the following description taken in conjunction with the accompanying drawings. Like reference numbers in the various drawings are used wherever feasible to indicate like elements. Further, the left-most numeral of each reference number conveys the Figure and associated discussion where the reference number is first introduced.

DETAILED DESCRIPTION

Overview

The present concepts relate to cloud-based systems and dynamic, resource-aware processing by applications running on cloud-based systems and connected devices.

Figure 1:
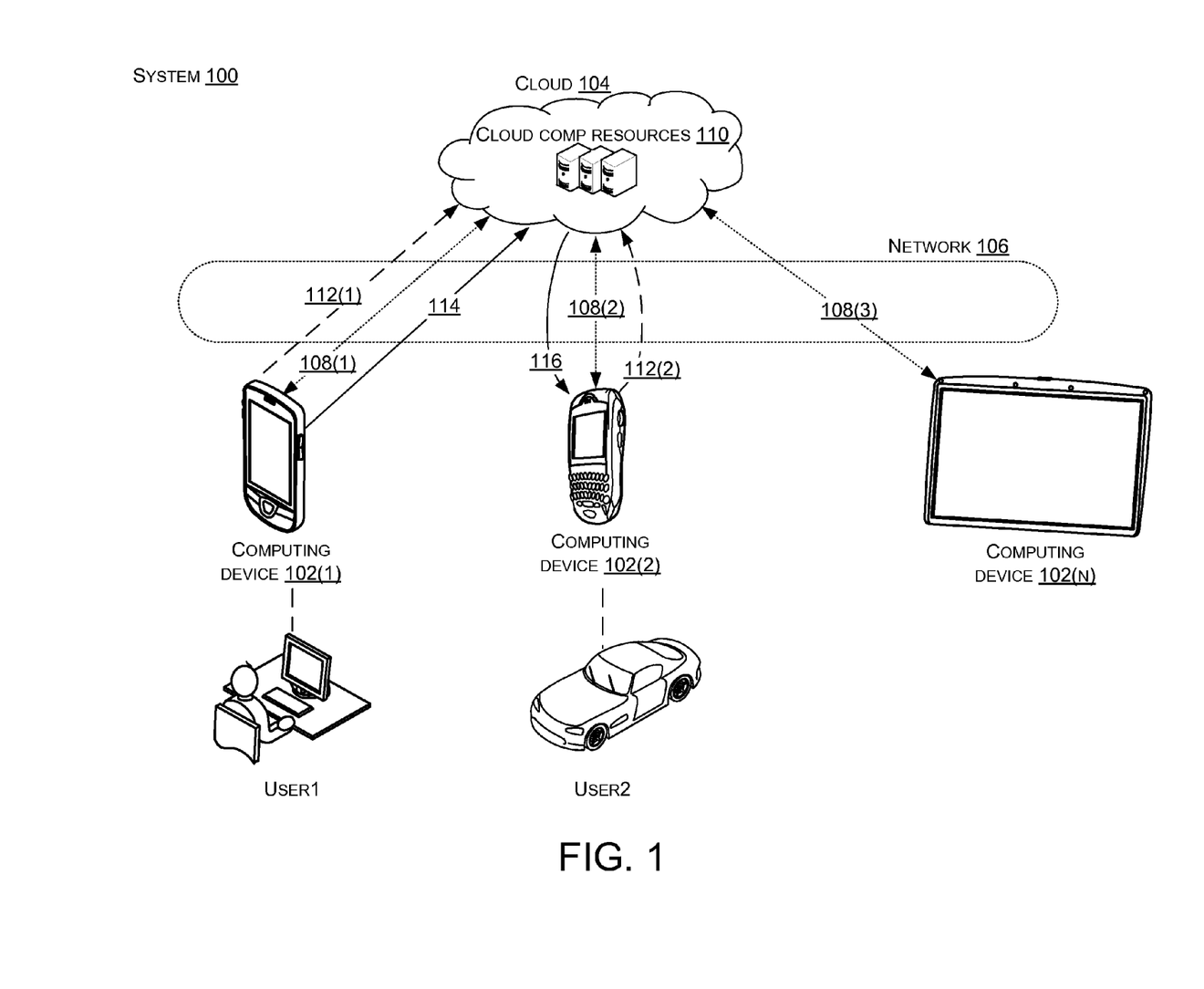
FIG. 1 shows an example of a system to which the present cloud-edge application resource usage concepts can be applied in accordance with some implementations.

For purposes of explanation consider introductory FIG. 1, which shows an example of a system 100 which can implement the present concepts. System 100 includes three cloud edge computing devices (hereinafter, "computing devices") 102(1), 102(2), and 102(N) (where N signifies that any number of computing devices could be utilized). The computing devices 102(1)-102(N) can communicate with the cloud 104 via a network 106 as indicated by lines 108(1)-108(3), respectively. In this example, individual computing devices can communicate with one another through the cloud 104, but not directly with other computing devices. The cloud 104 can offer vast amounts of computing resources 110, though the exact physical location of these computing resources may not be readily apparent. Cloud computing continues to gain in popularity because of the relatively cheap and plentiful computing resources that it offers.

Computing devices 102(1)-102(N) can be any type of computing devices. Commonly these computing devices are portable computing devices such as smart phones and tablet computers. The term "computer" or "computing device" as used herein can mean any type of device that has some amount of processing capability. While specific examples of such devices are illustrated for purposes of explanation, other examples of such devices can include traditional computing devices, such as personal computers, cell phones, smart phones, personal digital assistants, or any of a myriad of ever-evolving or yet to be developed types of devices. Further, rather than being free-standing, a computer may be incorporated into another device. For instance, a dashboard computer can be included into a car or other vehicle.

Viewed from one perspective, the computing devices 102(1)-102(N) can be thought of as 'edge devices' in a topology supported by the cloud 104 and network 106. Many of these edge devices are equipped with sensors that produce frequent or continuous streams of real-time data such as user's GPS location, speed, current activity, device's battery usage, etc. In addition, there can be an increasing amount of slower-changing reference data, such as social network graphs and fuel prices at gas stations being made available at the cloud, e.g., via data markets. This proliferation of computing devices and data has fueled increasing interest in an emerging class of real-time cloud-edge applications (or, cloud-edge apps for short). These cloud-edge apps can provide services, such as notifications or recommendations based on real-time feeds collected from a large number of edge computing devices and the cloud.

In some scenarios, the computing devices 102(1)-102(N) communicate their data to the cloud 104 for processing by one or more service providers running on cloud computing resources 110. For instance, assume for purposes of explanation that one such service is a friend-finder service that notifies a user whenever any of her friends are near her current location. In some implementations, the friend-finder service can be accomplished by a friend-finder application running on cloud computing resources 110 and corresponding friend-finder applications running on individual computing devices 102(1)-102(N).

Enabling the friend-finder application entails correlation of real-time locations from users' smartphones (e.g., computing devices 102(1)-102(N)) as well as slowly changing reference data such as a social network (defining the friend relationship). For ease of explanation consider only computing devices 102(1) and 102(2) and assume that computing device 102(1) belongs to User1 and that computing device 102(2) belongs to User2. Further, assume that User1 and User2 have been deemed as 'friends'. Each computing device can from time-to-time upload data to the cloud as indicated by arrows 112(1) and 112(2). The uploaded data can be processed by the service provider operating on the cloud computing resources 110. The service provider can determine results for each computing device and communicate those results back to the respective computing devices 102(1) and 102(2). In some cases, such a process can entail high numbers of uploading and downloading communications over network 106 between the cloud 104 and the computing devices 102(1) and 102(2). The present concepts can allow for an alternative option. This alternative option can be thought of as a dynamic resource-aware option. In the dynamic resource-aware option, one of the computing devices 102(1) and 102(2) may determine that system resource usage, such as these network communications, can be reduced by the individual computing device obtaining the data of the other computing device from the cloud and handling the processing locally on the individual computing device. (The network communications can be considered by number and/or by network bandwidth usage). In such a case, the individual computing device does not upload. The other (remaining) computing devices upload as normal, and the individual computing device downloads. This dynamic resource-aware option can be thought of as dynamic in that the resource usage calculations may change as the scenario changes. One such example is described below relative to a rate at which a computing device is generating location data. The resource usage calculations can produce a different result when the rate of location data changes. Thus, rather than being a one-time determination, the determination may be repeated in an iterative manner as conditions or parameters change.

To illustrate this reduced resource usage, suppose that computing device 102(1) belongs to User1 and that computing device 102(2) belongs to User2. Further assume that User1 is working in his/her office (e.g., relatively stationary) and User2 is driving in a nearby neighborhood. In the above-described fixed configuration, an existing friend-finder app will require User2 (computing device 102(2) to upload (112(2)) his/her location frequently (say, once every 10 seconds) so that the cloud knows his/her up-to-date location to correlate with User1's location. User1 (computing device 102(1)), however, can upload (112(1)) his/her location infrequently (say, once an hour) since he/she is not moving much. In this example, the total communication overhead of User1 and User2 will be 361 messages per hour (ignoring final notification messages) over network 106. This network usage can be expensive, especially when a user has many friends or runs many such apps. This can severely limit the utility of the application since it is forced to limit how frequently to correlate users' data, which translates to high notification latency. Moreover, users may simply turn the application off due to its high resource usage. However, this inefficiency can be addressed easily in the above example with the dynamic resource-aware option. Instead of using correlate-at-the-cloud methodology, User1's location can be sent to User2's computing device 102(2) (through the cloud 104 as indicated by arrows 114 and 116, respectively). The correlation can then be performed by User2's computing device. In this case, User2 does not need to send his/her location anywhere and the total cost would become only 2 messages per hour (one from User1 to the cloud, and the other from the cloud to User2). Note that at a subsequent point in time, such as when User1 is traveling home, the dynamic resource-aware option may determine a different approach, such as processing at the cloud 104.

In summary, the dynamic resource-aware option can determine what (if any) computation to push, and to which edge computing device to push it to. The determination can be thought of as an optimization problem that depends on various factors such as the network topology, rates of the data streams, data upload and download costs, pairs of streams to correlate, etc. Moreover, since these parameters can change over time (e.g., User1's rate can change when he/she starts traveling after office hours), the determination can be dynamically updated. One dynamic resource-aware option implementation is referred to as RACE and is described in detail below.

Briefly, RACE (for Real-time Applications over Cloud-Edge), is a framework and system for specifying and efficiently executing cloud-edge apps. RACE can use database techniques to address two main aspects. First, RACE addresses the specification of real-time cloud edge applications. Second, RACE addresses system resource usage associated with executing the real-time cloud edge applications. System resource usage can be enhanced and/or optimized (hereinafter, for the sake of brevity, the term "optimized" means "enhanced and/or optimized").

Specification of Cloud-Edge Applications

RACE addresses the specification of real-time cloud edge applications by abstracting the core logic of cloud-edge apps as platform-agnostic continuous queries (CQs) over a set of streaming data sources.

Cloud-edge apps are often written in standard imperative languages such as Objective C, Java or C#. Application developers are required to manually implement mechanisms that handle cross-device communications, publishing and subscribing to data streams, and time-related semantics in the application logic such as temporal joins and windowed computations. This process is time-consuming and error-prone. RACE can add platform support for common functionalities shared by most cloud-edge apps. Application designers can then focus on the core application logic, instead of the implementation details.

The present implementations leverage the fact that while different cloud-edge apps have diverse application-specific features (e.g., visualization and support for privacy), they can share some commonalities. For example, both the data and core application logic for cloud-edge apps are often temporal in nature. In other words, cloud-edge apps can be viewed as continuous queries that continuously correlate real-time and slower changing (but still temporal) reference data in a massively distributed system.

For instance, the friend-finder app can be thought of as a temporal join between the real-time GPS locations of edge devices and a slower-changing social network stream. A location-aware coupon application correlates current user location information with users' profiles (computed over a historical time window) and current advertisements. Thus, in some implementations, the specification language for cloud-edge apps should contain native support for temporal semantics. Such support enables clean expression of time-oriented operations such as temporal joins and windowed aggregations. Alternatively or additionally, the language can have other properties. For instance, one such property is the declarative nature of the specification language. This can allow application designers to specify applications in a declarative and network-topology agnostic manner, where they can focus on "what" the applications are, instead of "how" they are implemented. The implementation details can be transparent to application designers, and instead be handled automatically by the underlying platform. Another property can relate to succinctness. The specification of applications can be succinct, allowing productive prototyping, deployment, and debugging by the application designers. Succinctness is aligned naturally with the adoption of declarative specifications. Flexibility can be another property. The specification language can be flexible, such that application designers can easily customize the application according to different input/output sources and configurations.

The design space of specification languages is now described in light of these properties. Declarative languages such as SQL and Datalog (and its variants, e.g. Network Datalog) can allow succinct and flexible specification of continuous queries in distributed environments. However, these languages do not have native support for temporal semantics, which can be crucial for most cloud-edge apps. On the other hand, data stream management systems (DSMSs) use declarative temporal languages that satisfy the desired properties. Examples include LINQ™ for StreamInsight™, and StreamSQL™ for Oracle® CEP, and StreamBase™. The description below utilizes LINQ for StreamInsight as the specification language, but is applicable to other configurations. LINQ allows the declarative specification of temporal queries, and is based on a well-defined algebra and semantics that fit well with the temporal nature of cloud-edge apps.

The discussion that follows provides an example of a cloud-edge app specification. Recall that the friend-finder query finds all user pairs (User1, User2) that satisfy the conditions: 1) User2 is a friend of User1; and 2) the two users are geographically close to each other at a given time. At this point, for purposes of explanation, assume that the friend relation is asymmetric, i.e., User2 being a friend of User1 does not necessarily imply the converse, given a point in time. There are two inputs to the friend-finder app, namely the GPS location streams reported by the edge devices, and the social network data. The GPS locations are actively collected at runtime, whereas the social network data is relatively slow-changing and is generally available at the cloud. Friend-finder can be written as a two-stage temporal join query as illustrated below.

var query0=from e1 in location
      from e2 in socialNetwork
      where e1.UserId==e2.UserId
      select new {e1.UserId, e1.Latitude, e1.Longitude, e2.FriendId };
    var query1=from e1 in query0
      from e2 in location
      where e1.FriendId==e2.UserId && Distance (e1.Latitude, e1.Longitude, e2.Latitude, e2.Longitude)<THRESHOLD
      select new {User1=e1.UserId, User2=e2.UserId};

The first query (query0) joins the GPS location stream (location) with the social network reference stream (socialNetwork), and the resulting output stream is joined with the GPS locations again (in query1), to check the distance between each pair of friends. The final output is a stream of pairs (User1, User2) where the two users are friends and are geographically close to each other.

The query specification above defines the high-level logic of the query as temporal joins, and references the schemas of the location stream and socialNetwork stream. It is written over the social network stream and a conceptually unified GPS location stream input, and is thus network-topology-agnostic. As another example, assume that a desired function is to find friends who visited a particular location (say a restaurant) within the last week. To specify this, the present concepts can allow replacing the location input in query1 with location.AlterEventDuration (TimeSpan.FromDays(7)). This extends the "lifetime" of location events to 7 days, allowing the join to consider events from friends within the last week.

In summary, RACE can utilize a declarative specification of a cloud-edge app. RACE can execute the logic on the distributed system composed of the edge devices and the cloud. RACE can use an unmodified DSMS as a black box to locally execute queries on individual edge devices and the cloud. Some RACE implementations can operate on the assumption that the DSMS provides a management application program interface (API) for users to submit queries (that define the continuous queries to be executed), event types (that specify the schema of input data streams), and input and output adapters (that define how streaming data reaches the DSMS from the outside world and vice versa). Further, the API also allows users to start and stop queries on the DSMS.

Stated another way, some implementations may move different data streams (or parts of streams) to the cloud and/or to other edge computing devices via the cloud. Some other data streams may be retained locally at the device and not uploaded to the cloud. Further, these various (moved and local) streams can serve as inputs to application query segments running at various locations (such as a sub-set of the devices or even at the cloud). The output streams of such queries themselves can either be retained locally for further computations or uploaded to the cloud (and then possibly forwarded to other devices). Overall, the computation specified by the end user can be performed in a distributed manner.

Race Architecture

Figure 2:
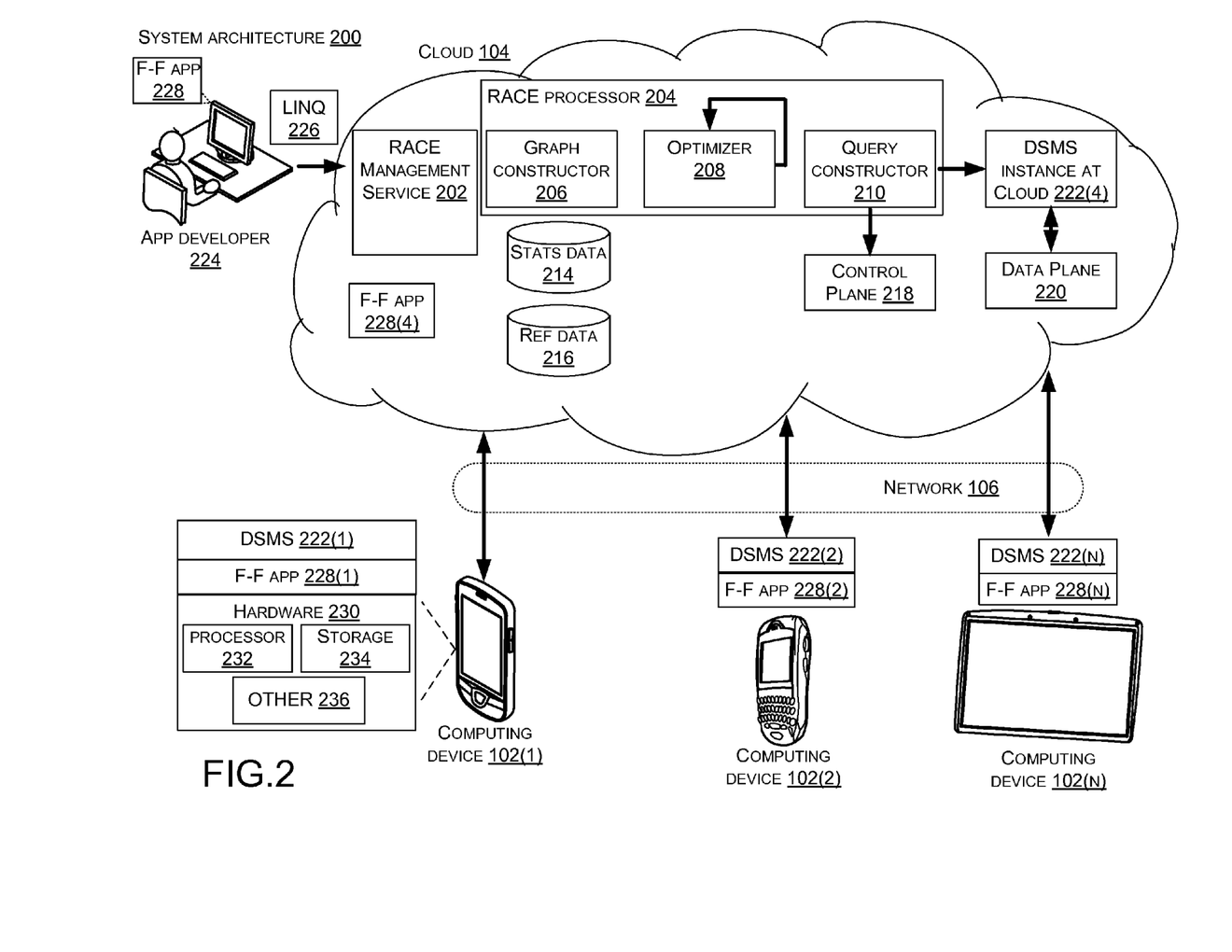
FIG. 2 shows an example of a system architecture to which the present cloud-edge application resource usage concepts can be applied in accordance with some implementations.

FIG. 2 shows an overall system or system architecture 200 of one RACE implementation. System architecture 200 carries over computing devices 102(1)-102(N), cloud 104, and network 106 from FIG. 1. System architecture 200 introduces a RACE management service 202 and a RACE processor 204. The RACE processor includes a graph constructor 206, an optimizer 208, and a query constructor 210. System architecture 200 also includes statistics data 214, reference data 216, a control plane 218, and a data plane 220. The computing devices 102(1)-102(N) include an instance of DSMS 222(1)-222(3), respectively. A DSMS instance 222(4) also occurs in the cloud 104.

The system architecture 200 is explained relative to an experience provided to an application developer 224. The application developer can interact with the RACE management service 202 by writing an application in a declarative and temporal language, such as LINQ 226. Assume for purposes of explanation that the application is a friend-finder app 228. The functionality of friend-finder apps was introduced above relative to FIG. 1. The friend-finder app 228 can be manifest on individual computing devices 102(1)-102(N) as friend-finder app instantiations 228(1)-228(3), respectfully, and on cloud 104 as friend-finder app instantiations 228(4). Further, while only illustrated relative to computing device 102(1) for sake of brevity, the individual computing devices can include various hardware 230. In this example the illustrated hardware is a processor 232, storage 234, and other 236. The above mentioned elements are described in more detail below.

Processor 232 can execute data in the form of computer-readable instructions to provide a functionality, such as a friend-finder functionality. Data, such as computer-readable instructions, can be stored on storage 234. The storage can be internal or external to the computing device. The storage 234 can include any one or more of volatile or non-volatile memory, hard drives, and/or optical storage devices (e.g., CDs, DVDs etc.), among others.

Computer 102(1) can also be configured to receive and/or generate data in the form of computer-readable instructions from storage 234. Computer 102(1) may also receive data in the form of computer-readable instructions over network 106 that is then stored on the computer for execution by its processor.

In an alternative configuration, computer 102(1) can be implemented as a system on a chip (SOC) type design. In such a case, functionality provided by the computer can be integrated on a single SOC or multiple coupled SOCs. In some configurations, computing devices can include shared resources and dedicated resources. An interface(s) facilitates communication between the shared resources and the dedicated resources. As the name implies, dedicated resources can be thought of as including individual portions that are dedicated to achieving specific functionalities. Shared resources can be storage, processing units, etc. that can be used by multiple functionalities.

Generally, any of the functions described herein can be implemented using software, firmware, hardware (e.g., fixed-logic circuitry), manual processing, or a combination of these implementations. The terms "tool", "component", or "module" as used herein generally represent software, firmware, hardware, whole devices or networks, or a combination thereof. In the case of a software implementation, for instance, these may represent program code that performs specified tasks when executed on a processor (e.g., CPU or CPUs). The program code can be stored in one or more computer-readable memory devices, such as computer-readable storage media. The features and techniques of the component are platform-independent, meaning that they may be implemented on a variety of commercial computing platforms having a variety of processing configurations.

As used herein, the term "computer-readable media" can include transitory and non-transitory instructions. In contrast, the term "computer-readable storage media" excludes transitory instances. Computer-readable storage media can include "computer-readable storage devices". Examples of computer-readable storage devices include volatile storage media, such as RAM, and non-volatile storage media, such as hard drives, optical discs, and flash memory, among others.

The other hardware 236 can include displays, input/output devices, sensors, etc. that may be implemented on various computing devices.

The RACE management service 202 can run in the cloud 104 and expose a management service that is fully compatible with the DSMS's management API. Thus, individual computing devices 102(1)-102(N) can submit their declarative cloud-edge app logic to RACE management service 202 as regular temporal declarative queries supported by the respective DSMS 222(1)-222(N). Note that from the edge device's perspective (e.g., computing devices 102(1)-102(N)), they simply appear to communicate with a normal DSMS engine.

Viewed from another perspective, RACE management service 202 can be thought of as being configured to interact with an application executing on the cloud and at individual edge computing devices in communication with the cloud. The RACE management service 202 can be configured to mimic a DSMS engine to receive temporal declarative queries from the individual edge computing devices.

Briefly, the RACE processor 204 can be thought of as intercepting and parsing the incoming query, adapters, and types from the individual computing devices 102(1)-102(N) running the friend-finder app 228. The RACE processor 204 then compiles these inputs into an object representation of the original query. The object representation is passed to the graph constructor module 206 that converts the original query into a larger query graph. For example, the larger query graph can include per-edge input streams and operators. The query graph is passed to the optimizer module 208 to decide the optimal operator placement. Finally, the query constructor module 210 can generate object representations of types, adapters, and (sub-)queries to be executed on individual computing device 102(1)-102(N) or at the cloud 104. These objects are sent to the individual DSMSs (via their management APIs) of the respective computing devices to execute the application logic in a distributed fashion. Note that while in this configuration, the RACE management service 202 and the RACE processor 204 are implemented on the cloud 104, in other implementations, alternatively or additionally, the RACE management service and/or the RACE processor could be implemented on one or more of computing devices 102(1)-102(N). The RACE management service and/or the RACE processor implemented on the computing devices could be freestanding or work in a cooperative manner with corresponding RACE management service and/or the RACE processor instantiations on the cloud.

Figure 3:
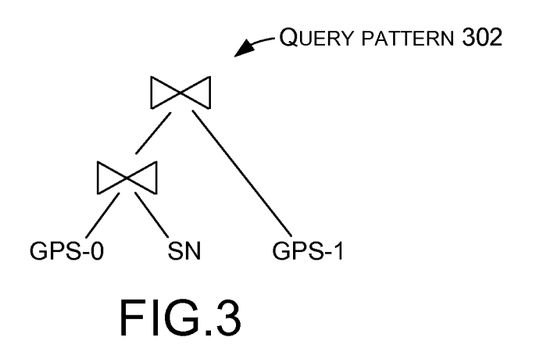
FIGS. 3-9 show graph examples to which the present cloud-edge application resource usage concepts can be applied in accordance with some implementations.

The graph constructor 206 can be thought of as taking the object representation of a query as input, along with statistics on stream rates and metadata information on each input. The graph constructor first can use the object representation of the query to generate a query pattern, which represents the template or skeleton for generating the expanded query graph. For instance, FIG. 3 illustrates the query pattern 302 output by the graph constructor 206 for the friend-finder query described above.

Figure 4:
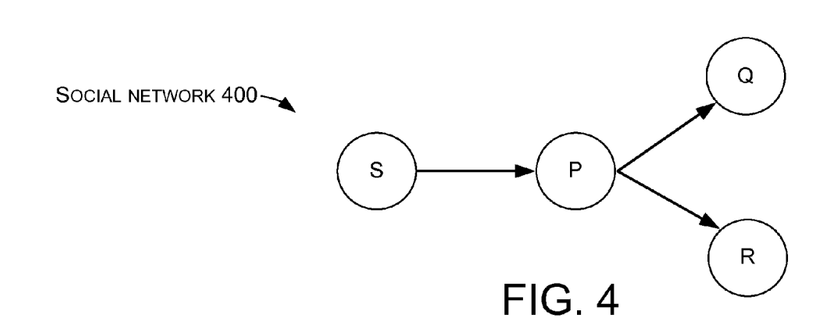
Figure 5:
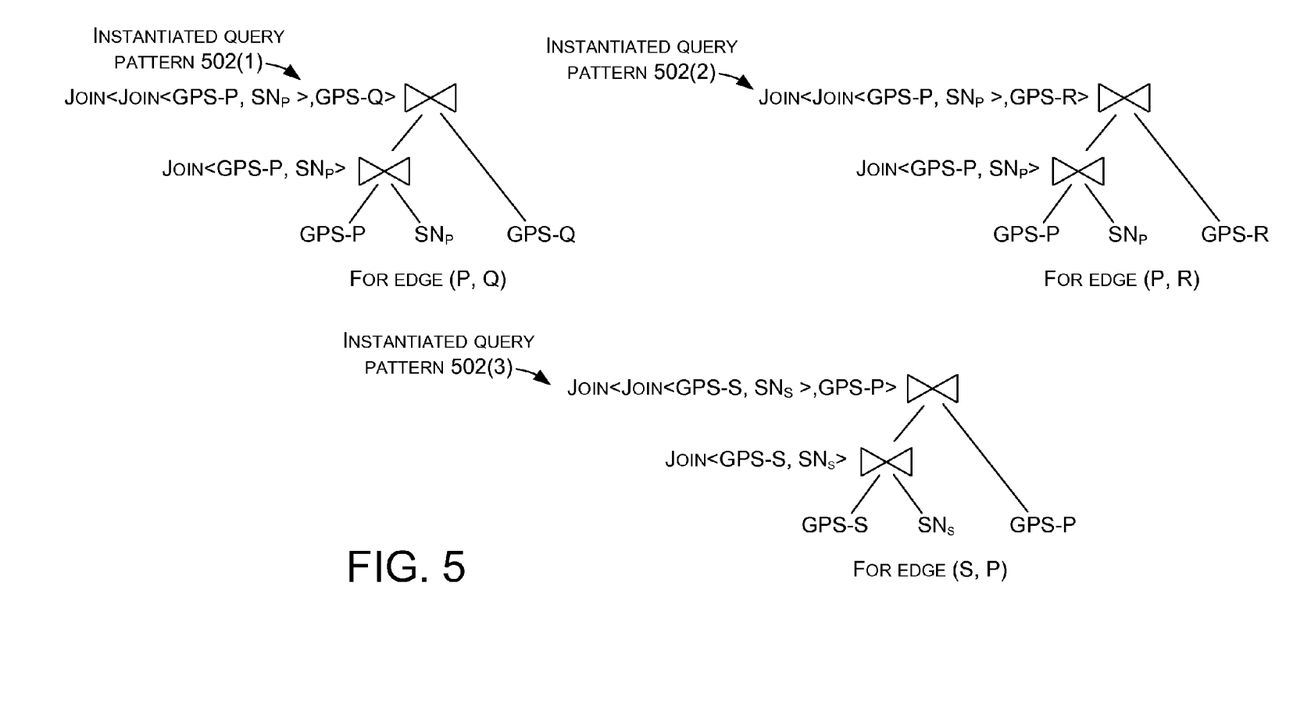

Some of the input streams in the query pattern 302 refer to per-device data streams such as GPS location sources. The graph constructor 206 can create multiple instances of the query pattern by splitting such streams into multiple inputs, one per edge. Slow-changing reference data inputs, such as the social network, can be materialized to limit the size of the generated query graph. For example, FIG. 4 shows a social network 400 of four users P, Q, R, and S. FIG. 5 shows corresponding instantiated query patterns 502(1), 502(2), and 502(3) for the friend-finder query. Note that in order to allow information sharing and avoid duplicated edges in the instantiated query patterns, the instantiated source and join operators are named carefully, as shown in FIG. 5. The final step is to stitch the instantiated query patterns 502(1)-502(3) into a complete query graph.

Figure 6:
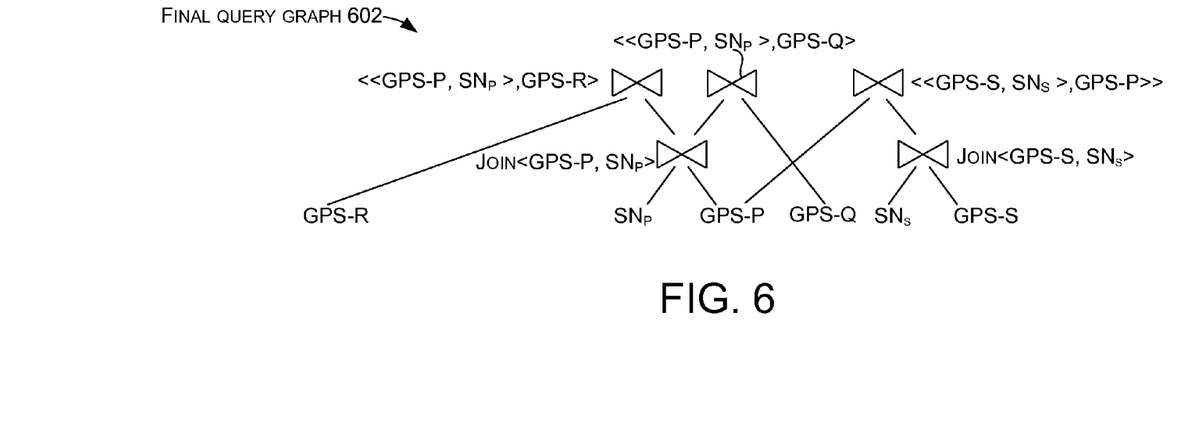

FIG. 6 shows a final query graph 602 derived from the instantiated query patterns shown in FIG. 5. Note that when combining the instantiated query patterns, the vertices (in the instantiated patterns) with the same name are mapped to the same vertex in the final query graph. For instance, the Join<GPS-P, SNP> vertex is shared by the instantiated patterns for edges (P; R) and (P; S).

Returning to FIG. 2, the optimizer module 208 accepts the final query graph 602 as input, and decides where to execute each operator (e.g., query part) in the query graph so that the total or collective communication cost of the application is minimized (or at least reduced). With thousands or even millions of users participating the cloud-edge system, the final query graph could be huge—containing millions of operators. For such a large query graph, the optimal operator placement is non-trivial. The RACE Optimizer module can utilize various techniques to determine optimal operator placement. One such technique is described below under the heading "Optimal Operator Placement". RACE can perform periodic re-optimization to adjust the placement to changes in the query graph and/or statistics.

After the decisions for enhanced/optimal operator placement are made, the RACE processor 204 has a set of rooted query graphs (each consisting of a directed acyclic graph (DAG) of temporal operators). Each such graph corresponds to some location (edge or cloud). The query constructor module 210 can generate object representations of the query components (including event types, adapters and queries) for each graph. The query constructor module can then submit object representations to the corresponding DSMS via the control plane 218. Note that two additional adapters can be installed at each DSMS instance—one to send event data to the data plane 220, and another to receive event data from the data plane.

The RACE control plane 218 is used to deploy the generated query fragments and metadata to the cloud instance and the edge instances of the DSMS, using the DSMS's management API. A complication is that edge devices (e.g., phones) are usually not directly reachable or addressable from RACE management service 202. Instead, the RACE management service can maintain a server to which the edge devices create and maintain persistent connections in order to receive management commands that are forwarded to the DSMS instances on the edges. During query execution, events flow between edge devices and the cloud. RACE management service 202 can use a separate data plane 220 that is exposed as a server at the cloud 104, and to which the edge computing devices 102(1)-102(N) can connect via the control plane 218. The generated queries on edge computing devices and the cloud subscribe to and publish named streams that are registered with the data plane 220. The data plane routes events from the cloud 104 to the edge computing devices 102(1)-102(N) and vice versa.

With thousands or even millions of users participating in the cloud-edge system, the final query graph could be huge—containing millions of operators. Since data sources are distributed (e.g., GPS data streams of various users are originated from their edge-devices), the placement of every operator has its impact to the query evaluation overhead. There are exponentially many different combinations of operator placement. A naïve approach that searches for the whole design space may not be feasible. In addition, considering the sharing of intermediate results makes the problem even harder.

The following discussion relates to an example of an efficient algorithm for optimal operator placement, by leveraging the special "star" topology of cloud-edge systems. For some implementations, the correctness of the algorithm can be proven given the two assumptions mentioned below. Further, the overhead of finding the optimal placement can be very low.

Assumption 1. The final output of queries are relatively much smaller than the input streaming data, and therefore its cost can be ignored.

This assumption is reasonable given the general nature of cloud-edge apps. In addition, based on privacy considerations, some implementations can restrict the allowed locations of operators. For instance, the streaming data may include sensitive personal information (e.g. the geo-location traces of a mobile phone). An edge client may not want to expose the raw information, unless it is properly processed (by excluding the sensitive data from the final results of a join operation), or if it is shipped only to nodes that have been authorized.

Assumption 2. For any join A ▷◁ B (where A and B are the input streams of the join), the join operation is performed either at the cloud or on the nodes where A or B originated.

Note that this assumption does not simplify the placement problem; there still exist an exponential number of possible operator placements. Before presenting the reasoning and the proposed algorithm several graph-based denotations are described.

Definition (Demand) Can be denoted, as a pair $(v_1, v_2)$, that a streaming data source $v_2$ "demands" (i.e., needs to correlate with) the data generated by another source $v_1$.

Definition (Demand Graph) Given a Cloud-Edge app, the demand graph $G=(V, E)$ is defined as follows: the vertex set $V=\{v/v \text{ is a streaming data source}\}$, and $E=\{(v_1, v_2)|(v_1, v_2) \text{ is a demand pair}\}$. Each edge $e=(i,)\in E$ is associated with a rate $r_{ij}$, indicating the rate of $v_j$'s stream that is demanded by $v_j$.

Algorithm 1. Generate Demand Graph from Query Graph

```
func DemandGraph (G^D = (V^D, E^D))
    V^D ← φ; E^D ← φ
    for ∀ v_1 ∈ V^Q do
        suppose e^2 = (v_2, v_1) ∈ E^D, e_2 = (v'_2, v_1) ∈ E^D
        V^D ← V^D + {v_1}
        E^D ← E^D + {e'_1 = (v_2, v'_2), e'_2 = (v'_2, v_2)}
    end for
    return G^D = (V^D, E^D)
```

Figure 7:
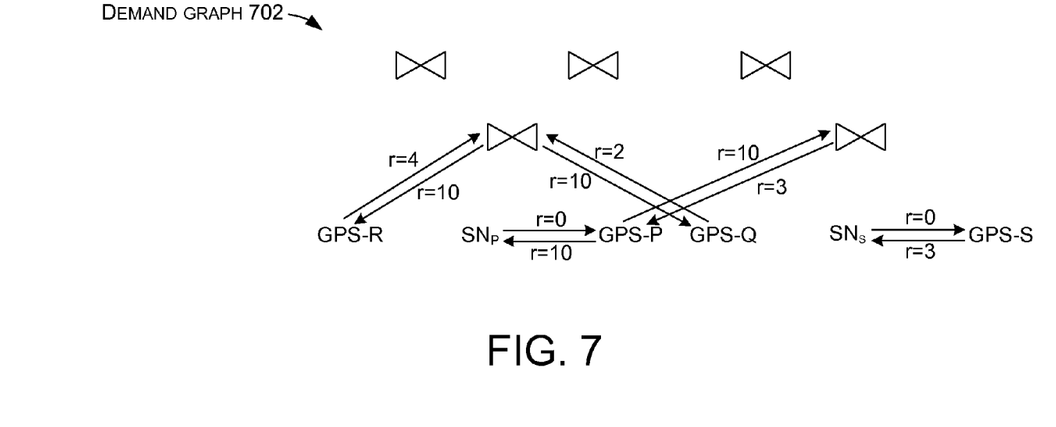

FIG. 7 shows the corresponding demand graph 702 for the friend-finder query, given the social network shown in FIG. 4. Edges in the demand graph 702 illustrate the demand relationships. For instance, the edge (GPS-P, $SN_P$) indicates that the GPS reading from P (GPS-P) should be correlated with the social network ($SN_P$). In a demand graph, join operators are treated as virtual data sources in the demand graph (as they are producing join results as streams). Actually, there is a one-to-one mapping between demand graphs and query graphs. Given a query graph $G^Q=(V^Q, E^Q)$, Algorithm 1 generates the corresponding demand graph $G^D=(V^D, E^D)$. The query graph can be re-engineered from the demand graph by following a similar algorithm.

Assignment: Download vs. Upload. In general, deciding optimal operator placement for distributed query evaluation is known to be a hard problem. The essence of the proposed algorithm is rooted in leveraging a special network property of the cloud-edge architecture. In this case, edge computing devices cannot communicate with each other directly. Instead, to exchange information, the edge computing devices have to upload or download data through the cloud-side servers.

Definition (Upload and Download). Given a demand graph G=(V, E), for an edge (l, j)∈E, this implementation characterizes as $v_j$ as "uploading" on (l, j), if, regardless of where $v_j$ is placed (either at an edge computing device or the cloud server), it always makes the effort to have the corresponding stream (demanded by $v_j$) available at the cloud server; otherwise, $v_i$ is characterized as "downloading" on (i, j).

Intuitively, once a vertex decides to upload on an edge (which represents a required data correlation), there is no reason for it to download any data for this correlation from the cloud-side server, because the correlation can simply be performed at the cloud side (as the data has been made available at the cloud side already). Consider the following lemma.

Lemma 1. Given a demand graph G=(V,E), in its optimal operator placement, ∀(i,j)∈E, (i,j) has to be in one of the two statuses: either $v_i$ is uploading (but not downloading) or downloading (but not uploading) on (i,j).

Proof. Suppose a vertex $v_i$∈V decides to both upload and download on (i,). The join operator for the corresponding correlation can be placed at three locations (according to Assumption 2), namely $v_i$, $v_j$, and the cloud. In this case, the join operator cannot be placed at $v_i$ in the optimal placement: as $v_i$ is already uploading its stream. The join operation could have been performed at the cloud, in which case, it saves the communication cost for downloading $v_j$'s data to $v_i$. Therefore, $v_i$ is not downloading on (i,) (as no join operators are placed at $v_i$).

Lemma 1 offers support for the conclusion that, given a demand graph G=(V,E), there exists a mapping from its optimal placement to a set of upload vs. download decisions made on each vertex in G. Such a set of decisions is defined as an assignment.

Definition (Assignment). Given a demand graph G=(V,E), an assignment A:E→{D, U} is defined as follows: $A_{i,j}$=U if vertex $v_j$ decides to upload its streaming data on edge (i,j), otherwise, $A_{i,j}$=D.

Figure 8:
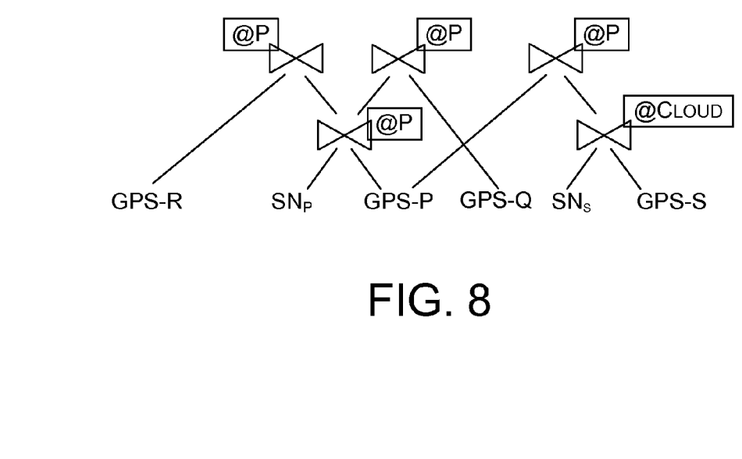
Figure 9:
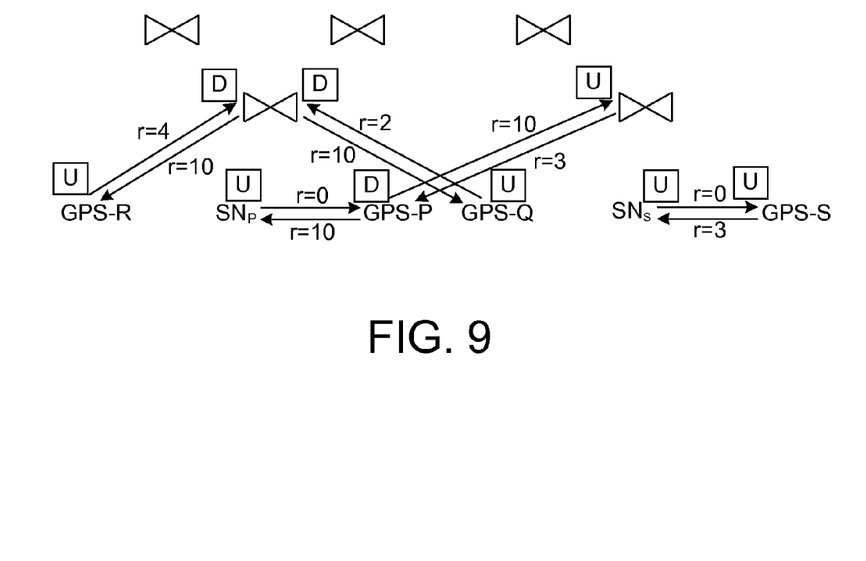

The optimal placement and its corresponding assignment can be denoted as $P^{opt}$ and $A^{opt}$. FIG. 8 shows the optimal placement ($P^{opt}$) for the demand graph 702 of FIG. 7. FIG. 9 shows the corresponding assignment ($A^{opt}$). In the optimal operator placement, the join between GPS-P and $SN_P$ is performed at node P, which means that the partitioned social network graph $SN_P$ should be shipped to node P, i.e., $SN_P$ is "uploaded" to the cloud, and GPS-P is not. This is consistent with the assignment given in FIG. 9.

It is natural to ask the questions 1) whether there exists a reverse mapping from $A^{opt}$ to $P^{opt}$, and 2) whether there exists an efficient algorithm to find $A^{opt}$, given a demand graph. The discussion below initially relates to the first question, and then gradually develops the answer for the second question.

Not all assignments can be mapped to a viable evaluation plan. There is a fundamental constraint: join requires the co-location of all its inputs. Therefore, for any join that takes inputs from different sources (edge devices), at most one device is downloading.

Definition (Viability and Conflict). Given a demand graph G=(V, E), an assignment A is viable if it satisfies the following condition: ∀e=(i,j)∈E, $A_{i,j}$≠D ∨ $A_{j,i}$≠D. An edge that breaks this condition is called a conflict edge.

For example, FIG. 9 illustrates a viable assignment given the demand graph shown in FIG. 7, as for any correlation, at most one data source is deciding to download. If the $A_{SNP,GPS-P}$ is changed to download, it will invalidate the assignment, as the edge (SN, GPS-C) is a conflict edge.

Algorithm 2. Compute Placement from Assignment

```
func Placement(G^Q = (V^Q E^Q), Assign)
    // Initialize the placement of leaf vertices (i.e., raw sources)
    Placement ← { }
    for ∀ v ∈ V^Q do
        if ∃ e = (v', v) ∈ E^Q then
            Placement_v ← v
        end if
    end for
    // Determine operator placement in a bottom-up fashion
    TopoOrder ← V^Q sorted by topology sort.
    for ∀ v ∈ TopoOrder in the bottom - up order do
        Suppose e_1 = (v_1, v) ∈ E^Q, e_2 = (v_2, v) ∈ E^Q
        if Assign_v1 = D then Placement_v ← Placement_v1
        else if Assign_v2 = D then Placement_v ← Placement_v2
        else Placement_v ← Cloud
    end for
    return Placement
```

Lemma 2. Given a viable assignment A, A can be mapped to a corresponding operator placement.

Proof. Prove by construction. Operator placement is decided in a bottom-up fashion (shown as Algorithm 2). As the base case, the locations of the leaf vertices in a query graph are known (trivially the stream sources). For an internal vertex (i.e., a virtual vertex that represents a join operator), according to assumption 2, it can either be placed at the cloud-side server, or co-locates with one of its inputs. If all its input sources decide to upload, then the join operator should be placed at the cloud; otherwise, there is one and only one input source (given that assignment A is viable) deciding to download, then the join operator should be co-located with that input source.

Theorem 4.5 The optimal operator placement problem can be reduced to finding a viable assignment with optimal cost (directly derived from Lemma 1 and Lemma 2).

Single-level Join Queries

This discussion starts with a simple scenario, where applications are specified as single-level join queries. The discussion will be extended to multilevel join queries in the discussion that follows.

Same Demand Rate

The discussion first considers a special case of the single-level join queries, in which, for any vertex i in a demand graph, the stream rates for all outgoing edges are the same, namely, $\forall(i,j) \in E; r_{i,j}=r_i$. Basically, a join operator requires the full streaming data from each input stream to perform the join operation. This corresponds to the queries where no filtering (such as projection or selection) is performed before the join.

Instead of directly considering the cost of an assignment, some implementations can compute the gain of switching upload and download (which could be positive or negative) compared to a base viable assignment—a naïve solution that all vertices decide to upload their streaming data. By switching a vertex i from upload to download, the gain can be computed as follows: $gain_i = r_i - \Sigma_{(i,j) \in E} r_j$. Namely, the gain can be thought of as the benefit of not uploading i's streaming data at a cost of downloading all the streams that are correlated with i's stream.

Definition (Global optimality). Given a demand graph G=(V,E), for the global optimal assignment is a viable assignment A that maximizes the total gains.

The following technique to find an assignment $A^{opt}$ that gives the global optimality considers a greedy approach where each vertex in the demand graph locally makes the assignment decision based on its own benefit.

Definition (Local optimality). Given a demand graph G=(V,E), for each vertex $v \in V$, the local optimal assignment for v is a local decision on $A_v$ that maximize the local gain. Specifically, $A_v$=D if and only if $gain_v > 0$.

It can be proven that the local optimality is actually consistent with the global optimality, which has two implications: First, the overhead for computing the local optimality is low, which is linear to the number of degrees of the vertex in the demand graph. Second, it means that the assignment problem can be partitioned and solved in parallel. This is particularly important in cases where the demand graph is huge, as this technique can leverage the vast computation resources at the cloud to solve it efficiently.

Theorem 1. Given a demand graph G=(V, E), the assignment A={$A_v$|$A_v$=local optimal assignment at v, $v \in V$} is viable.

Proof. Prove by contradiction. Suppose there exist a conflict edge e=(i,j), which means that $A_i$=D and $A_j$=D. $A_i$=D provides that $gain_i = r_i - \Sigma_{(i,j) \in E} r_j > 0$. Therefore, $r_i > r_j$. Similarly, $r_j > r_i$ can be derived from $A_j$=D. Contradiction.

Theorem 2. Local optimality is consistent with global optimality, namely, global optimality can be derived by individually applying local optimality.

Proof. 1) Theorem 1 shows that the assignment derived by individually applying local optimality is viable. 2) Each local optimality is computing the maximal gain for an isolated physical link, and the global optimality is simply addition of the gains on the physical links.

Different Demand Rates

The discussion is now extended to consider the scenario where, for a given vertex i, the stream rates demanded by each of the other vertices may be different. For example, in the case of the friend-finder app, the event rate for a particular user may be different with respect to each of their friends. Here, it is assumed that the stream with a lower rate can be constructed using one with a higher rate, which corresponds to queries that apply sampling filters. In other words, a filter that needs to sample x events/sec can be provided by another filter that samples y events/sec, for any $y \geq x$. In such a scenario, decisions on uploading versus downloading need to be made for each edge (instead of each vertex) in the demand graph.

Assuming the rates $r_{i,v_j}$ are sorted at vertex i, such that $r_{i,v_1} < r_{i,v_2} < \ldots < r_{i,v_p}$, it is not hard to see that an optimal assignment for the p sorted edges must have the pattern [U, . . . , U, D, . . . , D].

Definition (Local optimality). Consider the gain in an assignment $\forall j \leq k, A_{i,vj}=U, \forall j > k, A_{i,v_j}=D$: $gain_{i,v_k}=r_{i,v_p}-r_{i,v_k}-\Sigma_{k+1 \leq s \leq p} r_{v_s,i}$. Some implementations can select $k=argmax_{1 \leq j \leq p} gain_{i,v_k}$, and configure the assignment in the pattern described above.

Lemma 4.8. After applying local optimality at vertex i, that $A_{i,v_j}$=D it is implied that $r_{i,v_j} > r_{v_j,i}$.

Proof. Proof by contradiction. Suppose $r_{i,v_j} \leq r_{v_j,i}$. According to the definition of local optimality:

$$Gain_{i,v_k} = r_{i,v_p} - r_{i,v_k} - \Sigma_{k+1 \leq s \leq p} r_{v_s,i}$$

$$Gain_{i,v_j} = r_{i,v_p} - r_{i,v_j} - \sum_{j+1 \leq s \leq p} r_{v_s,i}$$

Notice that j>k, since $A_{i,v_j}$=D. Also, $gain_{i,v_j} - gain_{i,v_k} = r_{i,v_k} + \Sigma_{k+1 \leq s \leq j-1} r_{v_s,i} + (r_{v_j,i} - r_{i,v_j}) > 0$. This creates a contradiction (since $gain_{i,v_k}$ is optimal).

Theorem 3. The viability theorem (Theorem 1) still holds.

Proof. Proof by contradiction. Suppose there exists a conflict edge $e(v_1, v_2)$. Applying Lemma 3, supplies $r_{v1,v2} > r_{v2,v1}$ from $A_{v1,v2}$=D, and $r_{v2,v1} > r_{v1,v2}$ from $A_{v2,v1}$=D, which produces a contradiction.

Multi-level Join Queries

When considering multi-level join queries, there can be difficulties that prevent naïvely applying the algorithm developed for single-level join queries. For example, for single-level join queries, the cost of the output streams for join operators is not considered (as it is assumed that the final output is negligible compared to the input streams). However, it is not the case for multi-level join queries. For example, when naïvely applying the algorithm presented in the prior section, an edge device may individually decide to download other streams and perform the computation locally. However, if the edge device is aware of the fact that the output stream is then required for a higher-level join operator (whose optimal placement is at the cloud side), it may make a different decision. The discussion below relates to how this challenge is resolved by extending the algorithm for single-level joins.

Assumption 3. A data stream from a given edge appears in no more than one child subtree of any operator in the query graph.

This is a reasonable assumption, since one can simply combine streams from the same edge device into a single stream, or locally perform the necessary computation that these streams are involved in. Note that this assumption does not preclude sharing of source or intermediate results, and in particular, it always holds in case the query pattern is a left-deep tree over different data sources.

Operator Placement in a Top-down Fashion

The internal join operators in the query graph can be viewed as virtual stream sources, except that their locations need to be decided. Intuitively, given a query graph, the present techniques can make the upload vs. download decisions for the operators in the top-down fashion. For example, the decision can be made for a given vertex $v_1$ that corresponds to a join operator, as long as the location where its output should be shipped to (based on the placement decision made by its parent operator) is known. The algorithm for the single-level join queries can be straightforwardly extended by additionally including the cost of shipping the output stream to the destination.

Note that the only destination considered is the cloud side. For example, even if the destination is another edge device (as the output stream is required by another vertex $v_2$ located at the edge device), the technique need not consider the downloading part of the shipping cost (i.e., the cost of sending the output stream from cloud side to that edge device), as this downloading cost is already considered in calculating the gain for $v_2$. Note that Assumptions 1 and 3 ensure that when considering vertex $v_1$, the actual placement decision can be disregarded for its destination, as it will definitely be placed either at the cloud or at some other edge that $v_1$ (or its subtree) do not overlap with. This key observation makes the extension of the algorithm possible, and it can easily be shown that the extended algorithm still guarantees a viable and optimal assignment.

Upload vs. Download in a Top-down Fashion

Notice that the previous approach (for single-level join queries) derives the placement of operators in the bottom-up fashion after the upload vs. download decisions are made. Algorithm 3 can be tweaked to decide upload vs. download assignment, based on the parent operators' assignment instead of their placement (as the placement is not available).

Once the decision of the parent vertex $v_1$, is known, some implementations can consider what decision should be made for a child vertex $v_2$. Again, $v_2$ has two choices—either upload or download.

In one scenario, if the decision of the parent vertex $v_1$ is download, it means that there is no need to make the effort to have the output available at the cloud server. Therefore, when finding the local optimality for $v_2$, the cost of the output stream is not considered in computing the gains.

In another scenario, if the decision of the parent vertex $v_1$ is upload, it means that the output stream of $v_2$ should be made available at the cloud server. Therefore, when finding the local optimality for $v_2$, the cost of the output stream should be considered.

Algorithm 3 takes the demand graph $G=(V, E)$ as the input, and computes the optimal operator placement. The algorithm applies to a generic scenario where it assumes a multi-level join query, and per-edge demand rates (i.e., the rates associated with the demand edges starting from a given vertex might be different). According to Theorems 1 and 2, it is not hard to see that the derived assignment is viable and optimal. Algorithm 3. Compute Optimal Assignment.

```
func Assignment(G^Q = (V^Q,E^Q),G^D = (V^D,E^D))
   // Compute local optimality in a top-dwon fashion
   TopoOrder ← V^Q sorted by topology sort:
   Assign ← { };
   for ∀ v ∈ TopoOrder in the top - down order do
      EStart ← {e_k = (v, v')|e_k ∈ E^D}
      Sort EStart according to r_{v,v'}
      r^{max} ← max_{(v,v')∈EStart} r_{v,v'}
      for ∀ e_k = (v_k,v'_k) ∈ EStart do
         gain_k ← r^{max} - r_{v_k,v'_k} - Σ_{k+1≤s≤p} r_{v_i,v_k}
         V_p ← v_k's parent in the query graph
         if Assign_{v_p} = U then
            //Gain should include the cost of join output.
            gain_k ← gain_k + r_{(i,j)} // r_{(i,j)} is cost of join result
         end if
      end for
      k^{opt} ← argmax_{1≤k≤p} gain_k
      for ∀1 ≤ k < k^{opt} do Assign_{v,k} ← U
      for ∀k^{opt} ≤ k ≤ p do Assign_{v,k} ← D
   end for
   return Assign
```

Asymmetric Upload/Download Costs

So far, the above techniques have operated on the assumption that the upload cost and the download cost are the same. However, in reality, it might not be the case. For example, the per-unit prices of bandwidth utilization for uploading and downloading might be different (e.g., a cloud service provider may introduce asymmetric costs to encourage users to feed data into the cloud). As another example, an edge device might exhibit different battery consumptions for uploading and downloading.

The discussion that follows considers asymmetric upload/download costs. The per-unit cost for uploading and download are denoted as $c^u$ and $c^d$. For scenarios where $c^u<c^d$, the results for $c^u=c^d$ presented in the previous sections still hold. Basically, the reasoning of the key viability theorem (Theorem 1) holds.

On the other hand, deciding optimal operator placement is a harder problem for cases where $c^u>c^d$. For a special case where $c^d=0$, it can be shown that the optimal operator placement problem is provable hard by reduction from the classic weighted min vertex cover (WMVC) problem. Essentially, the viability theorem breaks in these cases, therefore, having edge devices individually apply local optimality may result in conflicts. In such cases, a viable assignment can still be obtained by resolving the conflicts by setting some vertices in the demand graph to upload with higher rates. Therefore, the problem reduces to the WMVC problem in the residual graph, which lacks an efficient general solution. The following discussion relates to a condition. If the condition is satisfied, the optimal operator placement problem can be solved efficiently.

Definition. Given a demand graph $G=(V,E)$, the skew of a vertex $v \in V$, $S_v$ is defined as the ratio between the maximum and minimum rate associated with the outgoing edges from v. Namely, $S_v = \max_{(v,i) \in E,i} r_{v,i} / \min_{(v,j) \in E} r_{v,j}$.

Definition Given a demand graph $G=(V,E)$, the skew of G is defined as the maximum skew among the nodes in G. Namely, $S = \max_{v \in V} S_v$.

| | Condition | Local Complexity |
|---|---|---|
| Select Conditions | None | O(N), N = # of friends |
| | Sampling | O(N logN), N = # of friends |

| | Condition | Global Complexity |
|---|---|---|
| Query Complexity | Single-level | Parallelizable local algorithm |
| | Multi-level | Local algorithm in top-down fashion |

| | | |
|---|---|---|
| Asymmetric Costs | $C^u < C^d$ | Parallelizable local algorithm |
| | $C^u > C^d$ | DP with acyclic residual graph |

Table 1: Shows a summary of the operator placement algorithm. Global optimality is achieved in all cases.

Lemma 4. Given the skew S of a graph G, if $c^d < c^u < (1+1/S) \cdot c^d$, after applying local optimality on all vertices, the residual graph G' that consists of the conflict edges is acyclic (i.e., separated trees).

Proof. Proof by contradiction. Suppose there exists a cycle $(v_1, v_2), (v_2, v_3), \ldots, (v_{(p-1)}, v_p), (v_p, v_1)$ in the residual graph G'. For the purpose of presentation, denote that $v_0 = v_p$ and $v_{(p+1)} = v_1$. Since every edge in the cycle is a conflict edge, $\forall 1 \leq i \leq p$, there is a loose bound that $$c^u \cdot \max(r_{v_i, v_{i-1}}, r_{v_i, v_{i+1}}) > c^d \cdot (r_{v_i-1, v_i} + r_{v_i+1, v_i}).$$

By adding these inequalities it can be derived that $$c^u \cdot \Sigma_{1 \leq i \leq p} \max(r_{v_i, v_{i-1}}, r_{v_i, v_{i+1}}) > c^d \cdot \Sigma_{1 \leq i \leq p} (r_{v_i-1, v_i} + r_{v_{i+1}, v_i}) = c^d \cdot \Sigma_{1 \leq i \leq p} \max(r_{v_i, v_{i-1}}, r_{v_i, v_{i+1}}) + c^d \cdot \Sigma_{1 \leq i \leq p} \min(r_{v_i, v_{i-1}}, r_{v_i, v_{i+1}}).$$

Therefore, this implementation can derive the following contradiction:

$$C^u / C^d > 1 + \frac{\sum_{1 \leq i \leq p} \min(r_{v_i, v_{i-1}}, r_{v_i, v_{i+1}})}{\sum_{1 \leq i \leq p} \max(r_{v_i, v_{i-1}}, r_{v_i, v_{i+1}})} > 1 + 1/S.$$

Theorem 4. If $c^d < c^u < (1+1/S) \cdot c^d$, the optimal operator placement can be found in P-time.

Proof. It can be concluded by applying Lemma 4 that G' is acyclic. This discussion shows that, for each tree in the residual graph G', its weighted minimal vertex cover can be found in linear time, using a dynamic program algorithm.

Starting from the leaf vertices, for each vertex v, consider the cost of the vertex cover for the subtree (rooted by v), having (or not having) v in the cover set. For any inner vertex v, if v is not in the cover set, then all the children of v should be in the cover set. Therefore, $\text{Cost}_v^- = \Sigma_{t \in child(v)} \text{Cost}_t^+$. On the other hand, if v is in the cover set, then each subtree can independently choose its vertex cover: $\text{Cost}_v^+ = c_v + \min_{t \in child(v)}(\text{Cost}_t^-, \text{Cost}_t^+)$.

Note that for a special case where the stream rates required by different friends are the same, the optimal placement can be found in P-time, if $C^d < c^u < 2 \cdot c^d$ (which holds in most practical scenarios). Empirically, even if $c^u \geq 2 \cdot c^d$, the conflicting edges still form isolated trees.

Summary

Table 1 summarizes the theoretical results and the time complexity the proposed operator placement algorithm, given various combinations of query complexities, select conditions, and upload/download cost ratios.

The operator placement algorithm computes the globally optimal solution by individually considering local optimality for each vertex in the demand graph. This discussion proves that local optimality is consistent with the global optimality (if $c^u \leq c^d$). An efficient greedy algorithm is proposed for computing local optimality. With this efficient greedy algorithm each node individually chooses the solution that maximizes the local gain.

This algorithm handles both single-level and the more complex multi-level join queries. In the case of multi-level join queries internal join operators in a query graph are treated as virtual vertices. The local optimality can be computed for each individual vertex in a top-down fashion. In addition, in the common case where the residual graph is acyclic (for $c^u > c^d$), there is an efficient dynamic programming (DP) algorithm to find the optimal assignment for the demand graph. Therefore, an optimal operator placement for the query graph can be determined. The extension of these concepts to general query graphs with black-box operators is also explained.

Given the nature of cloud-edge apps (which are usually correlations across real-time data), the discussion above focused mainly on join queries (with sampling filters). The discussion that follows relates to how the proposed algorithm can be applied to support general query graphs in a cloud-edge topology. The discussion further explains how runtime dynamism such as changes in the query graph and event rates can be handled.

Handling General Query Graphs

A query graph G is defined as a directed acyclic graph (DAG) over a set of black-box operators (denoted as O), where the leafs in G are called sources, and the roots are called sinks. Each operator in O may take zero (for the sources) or more inputs, and its output may be used as an input to other operators. Selection and projection are examples of one-input operators, while join operation is an example of two-input operators (or a multi-input operator for bushy joins). The high-level intuitions of the operator placement algorithm still hold in that each operator can individually decide (in a top-down order) whether it should upload (or download) its output to optimize its local cost. In this case the viability of the assignment is still guaranteed as before. Moreover, given that the operators are considered as black-boxes, there is no further opportunity to exploit sharing across the output of different operators. In this case, the consistency between local optimal and global optimal still holds, following a similar reasoning as Theorem 2. Therefore, the problem can again be reduced to finding the optimal upload/download assignments, and the proposed efficient local optimality algorithms can be used.

Handling Dynamism

Some instances of the algorithm assume the availability of the query graph, and rate statistics for all streams. The optimal placement is computed based on this information collected at the optimization stage. However, the query graph may change over time, for example, due to the addition and removal of edges in the social network. Similarly, event rates may also change over time. Thus, it may be necessary to adapt to these changes during runtime. Given that the proposed optimization algorithm is very efficient, the periodic re-optimization is a viable solution. However, re-optimization may encounter deployment overhead (e.g., sending control plane messages such as query definitions). If implementations re-optimize very frequently, the re-optimization overhead may overshadow the benefits of the optimization.

To resolve this dilemma, one solution is to use a cost-based online algorithm. For instance, such algorithm can estimate and maintain the accumulated loss due to not performing re-optimization, and choose to perform the re-optimization if the accumulated loss exceeds the overhead of re-optimization. A potentially beneficial property of this approach is that it is 3-competitive—it is guaranteed that the overall cost is bounded by 3 times of the optimal (even with a priori knowledge of the changes).

The discussion above offers great detail of specific RACE implementations. RACE can support a broad class of real-time cloud-edge applications. RACE addressed two main technical challenges: (1) the specification of such applications; and (2) their optimized execution in the cloud-edge topology. For (1), the discussion shows that using a declarative temporal query language (such as LINQ for StreamInsight) to express these applications is very powerful and intuitive. For (2), the use of DSMS engines is proposed to share processing and execute different portions of the application logic on edge devices and the cloud. Here, the novel algorithms are highly efficient yet provably minimize global network cost, while handling asymmetric networks, general query graphs, and sharing of intermediate results. The above RACE implementations are configured to work with Microsoft® StreamInsight®, a commercially available DSMS. Other implementations can be configured to use other DSMS options.

Experiments over real datasets indicated that the RACE optimizer is orders-of-magnitude more efficient than state-of-the-art optimal placement techniques. Further, the placements achieved by the present implementations incurred several factors lower cost than simpler schemes for a friend-finder app over a realistic social network graph with 8:6 million edges. RACE is easily parallelizable within the cloud. It also scales well using just a single machine on real deployments with up to 500 edge clients. Details of some implementations are described above at a fine level of granularity. The discussion below offers a broader description that can relate to the above mentioned implementations and/or to other implementations.

Further Method Examples

Figure 10:
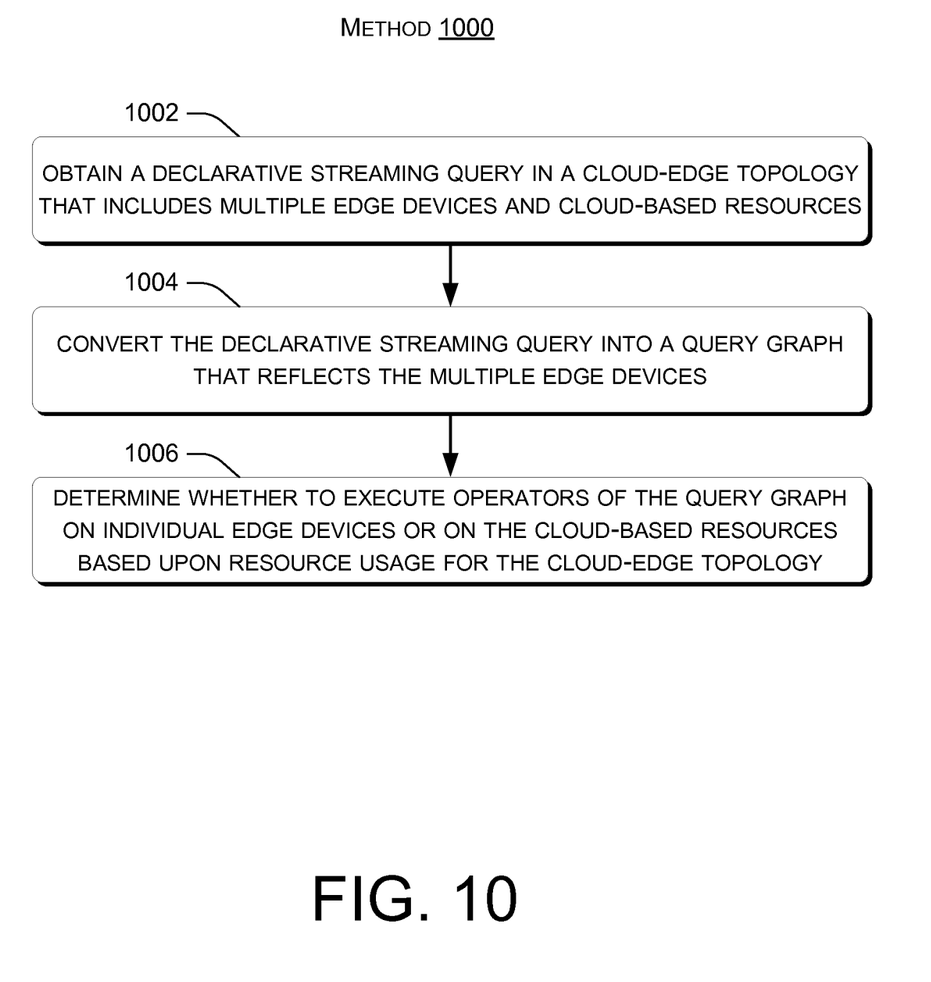
FIG. 10 shows a flowchart of an example of cloud-edge application resource usage techniques in accordance with some implementations of the present concepts.

FIG. 10 illustrates a flowchart of a technique or method 1000 that is consistent with at least some implementations of the present concepts.

At block 1002, the method can obtain a declarative streaming query in a cloud-edge topology that includes multiple edge devices and cloud-based resources.

At block 1004, the method can convert the declarative streaming query into a query graph that reflects the multiple edge devices.

At block 1006, the method can determine whether to execute operators of the query graph on individual edge devices or on the cloud-based resources based upon resource usage for the cloud-edge topology.

The order in which the above-mentioned methods are described is not intended to be construed as a limitation, and any number of the described blocks can be combined in any order to implement the method, or an alternate method. Furthermore, the method can be implemented in any suitable hardware, software, firmware, or combination thereof, such that a computing device can implement the method. In one case, the method is stored on a computer-readable storage media as a set of instructions such that execution by a computing device causes the computing device to perform the method.

CONCLUSION

Although techniques, methods, devices, systems, etc., pertaining to cloud edge resources and their allocation are described in language specific to structural features and/or methodological acts, it is to be understood that the subject matter defined in the appended claims is not necessarily limited to the specific features or acts described. Rather, the specific features and acts are disclosed as exemplary forms of implementing the claimed methods, devices, systems, etc.

The invention claimed is:

1. A system, comprising:
   storage storing a Real-time Applications over Cloud-Edge (RACE) cloud-based management service that is executable by a computing device, the RACE cloud-based management service configured to interact with an application executing on cloud-based resources and at individual edge computing devices in communication with the cloud-based resources, the RACE cloud-based management service configured to mimic a data stream management systems (DSMS) engine to receive temporal declarative queries from the individual edge computing devices; and,
   a hardware RACE processor configured to intercept the temporal declarative queries and to parse and compile individual temporal declarative queries into an object representation.

2. The system of claim 1, wherein the hardware RACE processor comprises a graph constructor configured to generate a query pattern from the object representation.

3. The system of claim 2, wherein, in an instance where the query pattern includes input streams that refer to data streams from each edge computing device, the graph constructor is further configured to create a query graph that includes multiple instances of the query pattern by splitting the data streams into multiple instances of the query pattern with one input stream per edge of the query graph.

4. The system of claim 3, wherein the hardware RACE processor comprises an optimizer configured to determine where to execute individual operators of the query graph to reduce total communication costs between the edge computing devices and the cloud-based resources.

5. The system of claim 4, wherein the optimizer is configured to determine where to execute individual operators of the query graph to minimize total communication costs between the edge computing devices and the cloud-based resources.

6. The system of claim 1, wherein the hardware RACE processor comprises a query constructor configured to generate object representations of types, adapters, and subqueries to be executed on each edge computing device or at the cloud.

7. The system of claim 1, manifest as cloud-based servers or manifest on one of the individual edge computing devices.

8. A method implemented by one or more computing devices, comprising:
   interacting with an application executing on cloud-based resources and at individual edge computing devices in communication with the cloud-based resources;
   intercepting and parsing temporal declarative queries from the individual edge computing devices, the temporal declarative queries being associated with the application; and,
   compiling individual temporal declarative queries into an object representation.

9. The method of claim 8, further comprising generating a query pattern from the object representation.

10. The method of claim 9, wherein, in an instance where the query pattern includes input streams that refer to data streams from each edge computing device, the method further comprises creating a query graph that includes multiple instances of the query pattern by splitting the data streams into multiple instances of the query pattern with one input stream per edge of the query graph.

11. The method of claim 10, further comprising determining where to execute individual operators of the query graph to reduce total communication costs between the edge computing devices and the cloud-based resources.

12. The method of claim 8, further comprising generating object representations of types, adapters, and sub-queries to be executed on each edge computing device or at the cloud-based resources.

13. The method of claim 8, wherein the one or more computing devices are manifest as cloud-based servers or manifest as at least one of the individual edge computing devices.

14. A system comprising:
a first processing device and a first storage device storing first computer-executable instructions which, when executed by the first processing device, cause the first processing device to:
interact with an application executing on cloud-based resources and at individual edge computing devices in communication with the cloud-based resources, and
receive temporal declarative queries from the individual edge computing devices; and,
a second processing device and a second storage device storing second computer-executable instructions which, when executed by the second processing device, cause the second processing device to:
intercept the temporal declarative queries, and
parse and compile individual temporal declarative queries into an object representation.

15. The system of claim 14, wherein the second computer-executable instructions further cause the second processing device to generate a query pattern from the object representation.

16. The system of claim 15, wherein, in an instance where the query pattern includes input streams that refer to data streams from each edge computing device, the second computer-executable instructions further cause the second processing device to create a query graph that includes multiple instances of the query pattern by splitting the data streams into multiple instances of the query pattern with one input stream per edge of the query graph.

17. The system of claim 16, wherein the second computer-executable instructions further cause the second processing device to determine where to execute individual operators of the query graph to reduce total communication costs between the edge computing devices and the cloud-based resources.

18. The system of claim 17, wherein the second computer-executable instructions further cause the second processing device to determine where to execute individual operators of the query graph to minimize total communication costs between the edge computing devices and the cloud-based resources.

19. The system of claim 14, wherein the second computer-executable instructions further cause the second processing device to generate object representations of types, adapters, and sub-queries to be executed on each edge computing device or at the cloud.

20. The system of claim 14, manifest as cloud-based servers or manifest on at least one of the individual edge computing devices.

* * * * *